United States Patent [19]

Kent

[11] 4,129,053
[45] Dec. 12, 1978

[54] BULK PRODUCT SLICING SYSTEM

[75] Inventor: David P. Kent, West Chester, Pa.

[73] Assignee: Control Process, Inc., West Chester, Pa.

[21] Appl. No.: 820,159

[22] Filed: Jul. 29, 1977

[51] Int. Cl.² .......................... B26D 5/20; B26D 4/24
[52] U.S. Cl. ........................................... 83/69; 83/77; 83/81; 83/89; 83/91
[58] Field of Search .................. 83/81, 69, 77, 84, 86, 83/88, 89, 90, 91, 92

[56] References Cited

U.S. PATENT DOCUMENTS

| | | | |
|---|---|---|---|
| 1,976,855 | 10/1934 | McKee et al. | 83/88 X |
| 3,203,326 | 8/1965 | Obenshain | 83/90 X |
| 3,821,913 | 7/1974 | Bajcar et al. | 83/92 |
| 3,842,698 | 10/1974 | Fitch et al. | 83/88 |
| 3,910,141 | 10/1975 | Divan | 83/89 X |
| 3,933,066 | 1/1976 | Spooner et al. | 83/92 |

Primary Examiner—Willie G. Abercrombie
Attorney, Agent, or Firm—Weiser, Stapler & Spivak

[57] ABSTRACT

The motor for the conveyor which removes accumulations of sliced product is controlled in a cycle which includes gradual acceleration and deceleration and higher peak speed.

16 Claims, 4 Drawing Figures

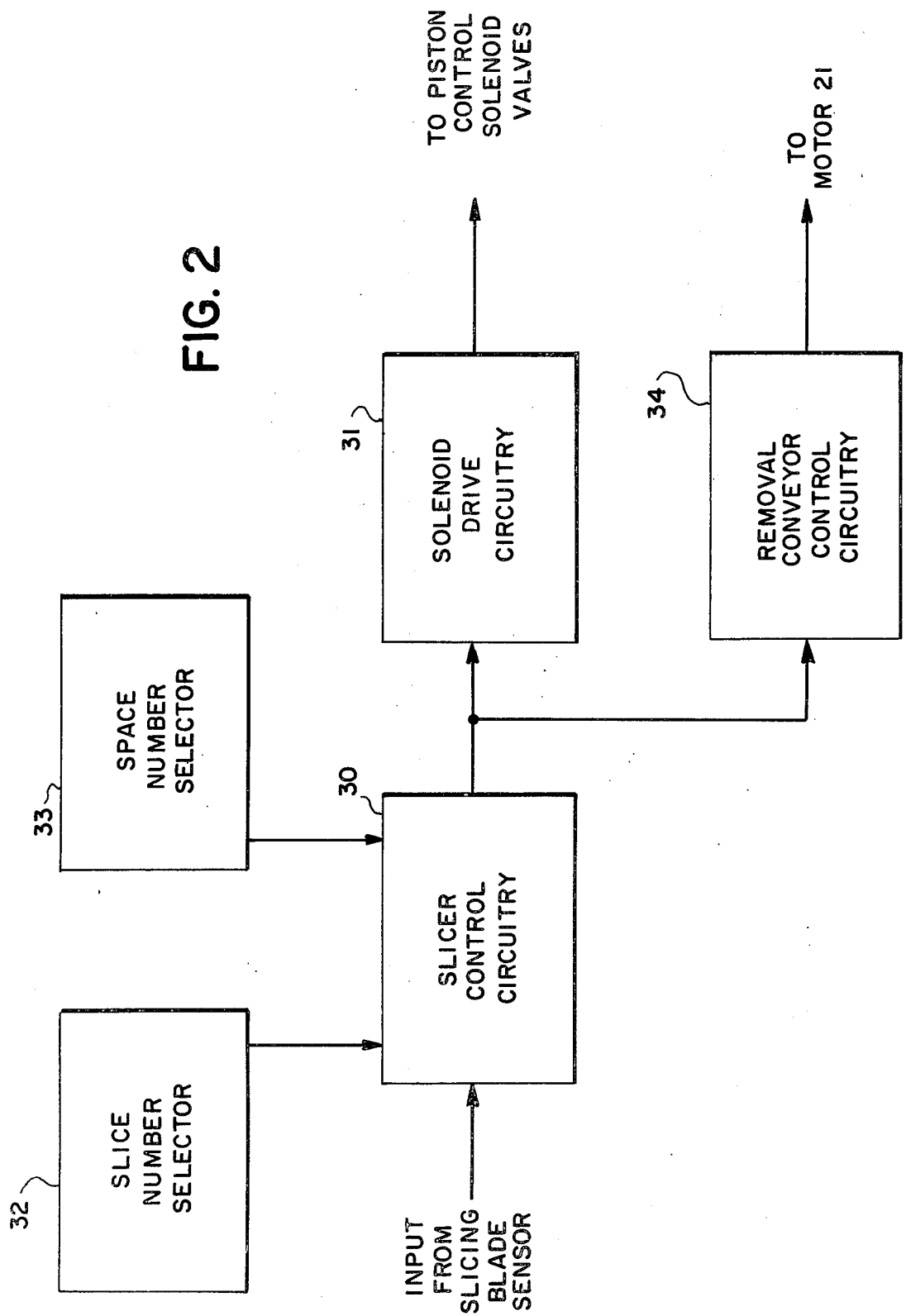

BULK PRODUCT SLICING SYSTEM

The present invention relates to equipment for transforming certain types of bulk food products into sliced portions. More particularly, the invention relates to apparatus which forms part of such equipment, but is specifically involved in the transportation of the product after the slices have initially been formed from the bulk product.

Machinery for slicing such bulk food products as cheese blocks, bacon, and other meat products is well known. In its simplest forms, such machinery includes a rotary slicing blade into which the bulk product is gradually pushed. The blade then cuts slices off the product and these drop onto a receiving surface on the opposite side of the blade.

For retail operations, movement of the bulk product, removal of the sliced product, and other control operations such as thickness of cut, are typically performed manually.

Not so in wholesale, or other high-volume processing situations.

There, the tendency has been to increasingly automate all the various functions to be performed. Numerous illustrations of the general trend could be cited. For present purposes, attention is invited to two instances, namely U.S. Pat. Nos. 3,910,141 and 3,965,783. Each of these shows a slicing system, including means for advancing the product to be sliced into the rotary cutting blade, means for removing the sliced product from the vicinity of the blade, and electronic control means for the various operations being performed. Various sophisticated control features have been built into such prior art equipment. For example, the above-mentioned U.S. Pat. No. 3,965,783 discloses electronic controls which are selectively adjustable to control the product removal mechanism in either of two modes.

In one mode, the removal mechanism is stationary while a predetermined number of slices accumulates thereon. These slices therefore tend to land more or less directly on top of each other, thereby forming a generally vertical stack. After the desired number of slices has accumulated, the removal mechanism is actuated and the entire stack is transported away from the slicing blade location for subsequent processing, e.g. weighing, packaging, and so forth.

In the other mode, the mechanism for removing sliced product is in motion during the slicing process. As a result, consecutive slices are deposited in only partially overlapping relationship with respect to each other. In the terminology of U.S. Pat. No. 3,965,783, this is referred to as "fanning."

In its basic principles, this automated type of arrangement appears to deal adquately with the situation. However, this appearance can be recognized as being deceptive, when those practical requirements and ramifications are taken into account which often represent the difference between success and failure in actual business operations.

For the type of equipment under discussion the "Achilles heel" is the interface between speed of operation and precision of results. For reasons of commercial efficiency, the trend has been to increasingly rapid slicing operations. Not too long ago, operation at a maximum rate of 450 slices per minute was considered commercially satisfactory. More recently, maximum slicing rates of 950 slices per minute are considered more appropriate, and the desire among commercial users of this type of equipment is for ever increasing speeds.

The reason for this is simply that "time is money," and faster operation leads to cost-savings through increased productivity. This is, of course, of particular importance in periods of rapidly rising general cost levels.

As these operating speeds rise, certain phenomena which could be safely ignored at lower speeds begin to manifest themselves deleteriously. In particular it has been observed that the uniformity of slice placement and configuration begins to noticeably deteriorate as speeds of operation increase toward current values.

In those cases in which it is desired to form vertically aligned stacks of the sliced product, irregularities in positioning of individual slices begin to appear. The whole stack may begin to lean or curve in one direction, or segments of the stack may deviate from strict vertical alignment.

In those cases in which it is desired to form accumulations of sliced products which exhibit fanning of the individual slices in each accumulation, there begin to develop irregularities in the degree of fanning.

In either case, the effect is not only esthetically perceptible—which in itself could be quite serious in a consumer product—but it also has adverse repercussions on subsequent processing. For example, automatic wrapping machines may no longer function with their intended degree of reliability if the product accumulations presented to them depart too far from the parameters for which they were designed. In extreme cases, this effect could shut down a whole production operation, even though each individual machine was ostensibly working properly.

This situation has given rise to considerable concern, and in turn, has led to efforts to overcome the problem. So far as is known, these efforts had been unsuccessful, prior to the making of the present invention. Indeed, it may even be that, heretofore, the subtle root cause of the problem had not been correctly identified.

Accordingly, it is a prime object of the invention to provide a technique for delivering sliced products under improved conditions.

It is another object to deliver accumulations of such sliced products in which the desired configuration is better achieved.

It is another object to preserve the desired configuration at higher operating speeds.

It is another object to preserve the configuration in fanning.

It is another object to preserve the configuration in stacking.

These and other objects which will appear are achieved in accordance with the present invention by providing electronic control means for the sliced product removal mechanism which closely regulates the accelerations and decelerations of that mechanism. More particularly, this control means so regulates the removal mechanism as to tend to reduce or eliminate irregularities which would otherwise occur in the product accumulations.

Preferably the removal mechanism itself is of a form which is particularly compatible with such control, even under high-speed operating conditions of the overall slicing equipment.

This provides an "elegant" solution to what had been considered as a vexing problem. As will be more fully explained below, its effectiveness is predicated on the recognition that it is the accelerations and/or decelerations of the removal mechanism which are the root cause of the disturbances in product configuration which had previously been encountered. Based on that recognition the appropriate remedial measures are then devised. As embodied in the present invention, those remedial measures are characterized by the twin advantages of simplicity and effectiveness. Moreover, their effectiveness does not inherently decline with increasing operating speed of the over-all slicing equipment.

For further details, reference is made to the discussion which follows, in light of the accompanying drawings, wherein FIG. 1 is a somewhat diagrammatic overall view of slicing equipment embodying the present invention;

FIG. 2 is a block diagram of portions of the electronic control means which form part of the equipment of FIG. 1;

The same reference numerals designate corresponding elements in the different figures.

Figure 1:
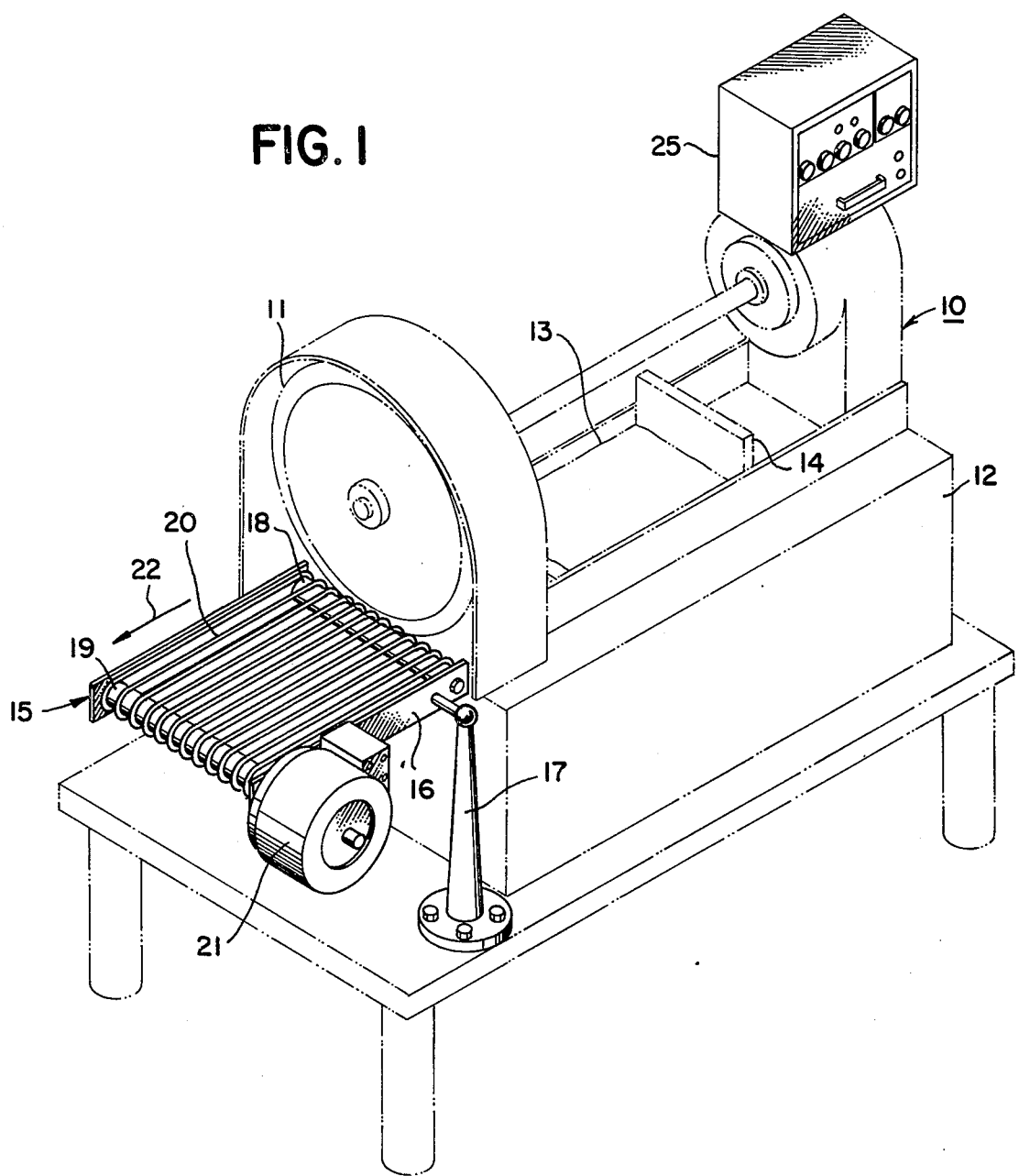

Referring now to the drawings, the overall slicing equipment shown in FIG. 1 includes a conventional slicing machine 10 having a slicing wheel, or blade 11 operated by a motor located within the bottom housing 12. The bulk product 13 which is to be sliced is placed in conventional position, where it is susceptible of being advanced (from upper right to lower left in FIG. 1) toward the slicing wheel 11 by apparatus 14. Conventional means are provided, such as a hydraulically actuated piston controlled by solenoid operated valves, to regulate the movement of this product advancing apparatus 14. With the exception of the control circuitry about which more will be said later, this machinery is all conventional and is therefore not discussed in greater detail here.

The equipment of FIG. 1 is also provided with a sensor (not shown) which is responsive to the rotation of slicing wheel 11 and produces an electrical signal each time that slicing wheel makes one revolution. Use of such a sensor, which may take the form of a magnetically actuated reed switch, is also conventional and not further described.

In operation, the equipment of FIG. 1 slices the bulk product 13 whenever that bulk product is being advanced into the rotating slicing wheel 11. The slices so produced then drop onto removal conveyor mechanism 15. This mechanism comprises a side frame 16 supported by a stand 17. Frame 16 holds drive rollers 18 and 19 at its horizontally opposed extremes. About these rollers 18 and 19 there are trained thin belts 20 which, in effect, form a platform at the output side of the slicing wheel 11. A motor 21 is also mounted on frame 16 and preferably directly connected to drive roller 19. The direction of rotation of motor 21 is such that the upper portion of belts 20 moves in the direction indicated by arrow 22 in FIG. 1.

The belts 20 are preferably narrow enough so that there is a substantial space between adjacent belts, preferably at least as wide as the individual belts themselves. The rollers 18 and 19 are provided with grooves within which the belts 20 are partially recessed so that these belts remain in parallel spaced alignment while moving in response to the drive provided by motor 21.

The motor 21 is preferably a high torque DC motor, capable of stopping and starting very frequently, and very rapidly. In practice this motor must be capable of starting and stopping completely at rates of half a revolution and above, occurring as frequently as four times per second. Motors capable of this performance are known. For example they are encountered in magnetic tape drives.

The motor 21 is preferably demountable without tools from frame 16 for ease and cleaning. By using narrow belts with appreciable spacing between them the self-cleaning action of this mechanism is also promoted, in that fragments of the sliced product do not tend to accumulate on the top surface of the belt, but rather tend to be shed by the belts and to drop through the open belt structure for collection below mechanism 15.

Control unit 25, which may be mounted in any location conveniently accessible to the operator of the slicing equipment 10, contains the electrical control circuitry for the equipment, and also the various external adjustment knobs for same.

FIG. 2, to which reference may now be had, shows in overall block diagram form this electrical control circuitry for the equipment of FIG. 1. The input signal to this circuitry is derived from the previously mentioned sensor which cooperates with slicing blade 11 in FIG. 1 to produce a signal indicative of the revolutions of that slicing blade. This signal is then supplied to slicer control circuitry 30 where it is appropriately processed to actuate driving circuitry 31 for controlling the solenoids which in turn control the movement of product advancing apparatus 14 toward the slicing blade.

A control circuit 32 is provided, preferably actuated by means of one or more selector knobs on the front panel of unit 25 of FIG. 1, for selecting the number of slices which are to be made by the slicing equipment 10 of FIG. 1. Likewise a control circuit 33 is provided, again preferably actuated by suitable selector knobs on unit 25 of FIG. 1, for determining the number of intervals during which slices could have been, but were not made between consecutive groups of such slices.

In response to these selector knob adjustments, the slicer control circuitry then sends control signals to solenoid drive circuitry 31 to which the latter, in turn, responds by appropriately activating and deactivating the valves controlling the hydraulic piston which causes product advancing apparatus 14 to alternately advance and stop. In this way, there is exerted automatic control over the accumulation of groups of slices on removal conveyor mechanism 15 in FIG. 1.

For example, the slice number selector 32 may be set to produce consecutively five slices of the bulk product 13. At the same time, space number selector 33 may be set to cause the slicing blade 11 then to not slice bulk product 13 for the span of time which would otherwise have been consumed while slicing seven additional slices. As a result the slicing equipment of FIG. 10 alternately produces 5 slices and then produces no additional slices for a period of time equivalent to the slicing time for seven more slices.

The circuitry which accomplishes the functions indicated within blocks 30 to 33 of FIG. 2 may take any conventional form. For example, it may be of conventional digital form utilizing appropriate digital circuitry actuated by the pulses from the sensor on slicing wheel 11 to produce at the output of slicer control circuit 30 a signal of one polarity at the time that slicing of the product by blade 11 is to start, and a signal of the opposite polarity at the time that slicing is to stop. Slice and space control circuits 32 and 33 may include adjustable counters for determining the number of such sensor pulses from slicing wheel 11, after which the above-mentioned polarity changes take place. Drive circuitry 31 is then conventionally responsive to these different polarity signals to control the solenoid valves and, through them, product advancing apparatus 14.

The slicer control circuitry 30 further cooperates with the control circuitry 34 for determining the movement of removal conveyor 15 of FIG. 1. The details of this are described further below. For the moment, suffice it to say that this removal conveyor control circuitry can be set to cause the removal conveyor to run continuously, or to alternately start and stop. If the conveyor runs continuously, then consecutive slices deposited on it by the operation of slicing wheel 11 will only partially overlap, the degree of overlap being determined by the rate of revolution of slicing wheel 11 and the speed of rotation of motor 21. If the removal conveyor 15 is stopped, then the slices deposited thereon will essentially overlap completely, therefore accumulating in stack configuration. If the removal conveyor is moving, the accumulation will take place instead in previously discussed fanning configuration. In the case of a continuously moving removal conveyor 15, a space in the slicing process will cause a gap in the accumulation of slices gradually being formed along that conveyor. In the case of a stopped conveyor 15, a space in the production of slices by slicing wheel 11 would not, in and of itself, produce a gap in the accumulating sliced product. Rather, to produce such a gap, the removal conveyor 15 must be set into motion during the period of time that a space is occurring in the slicing of product by slicing wheel 11.

Figure 3:
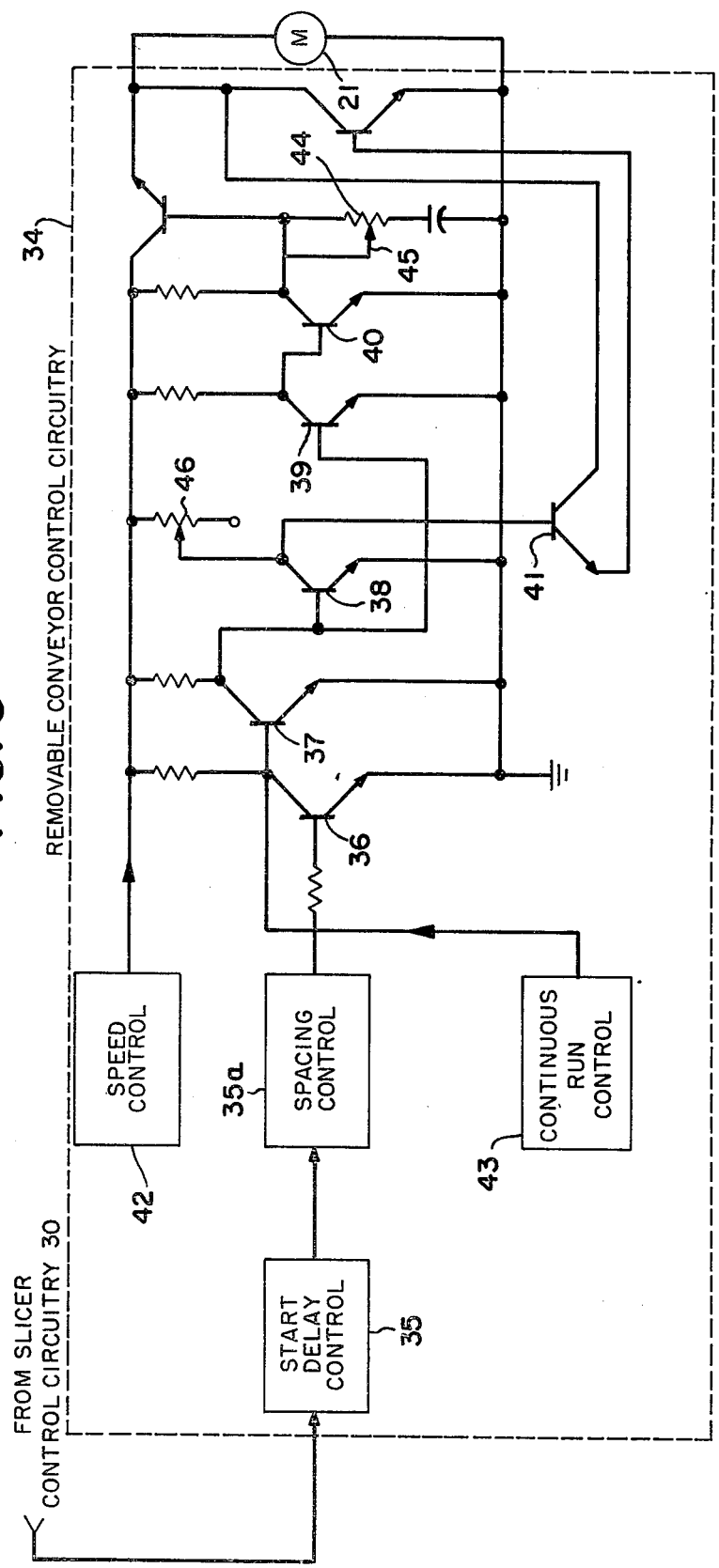
FIG. 3 is a partly schematic diagram of portions of the electronics of FIG. 2.

Additional details of the removal conveyor control circuitry 34 are shown in FIG. 3, to which reference may now be made. As shown therein, and consistently with FIG. 2, this control circuitry 34 receives its external input signal from slicer control circuitry 30. Initially this control signal from circuitry 30 is passed through a start delay control circuit 35 forming part of removal conveyor control circuitry 34. This start delay control circuit 35 may take any conventional form capable of delaying by various amounts the signal supplied to it from slicer control circuitry 30 before it reaches the remainder of removal conveyor control circuitry 34. An adjustment means is provided for varying the amount of such delay. Preferably this takes the form of a screwdriver adjustment.

The signal from start delay control circuit 35 then goes to a spacing control circuit 35a which is controllable to produce a pulse of controllable time duration in response to that portion of the signal from start delay control circuit 35 which denotes the end of a slicing interval, i.e. the beginning of a spacing interval. A knob on control unit 25 is preferably provided to control the duration of this pulse from circuit 35a.

The signal from spacing control circuit 35a then goes to control transistor stages 36 through 41. The output from transistor stage 37 is supplied to two subsequent stages 38 and 39. Stage 38 has its output supplied to motor 21 through stage 41, while stage 39 in turn has its output supplied to motor 21 through stage 40.

A speed control circuit 42 for motor 21 is also incorporated within control circuitry 34. This speed control circuit 42 may take the form of a variable B+ supply voltage for the various transistor stages within the circuit. By varying this B+ voltage, the output voltage applied to the motor 21 is correspondingly controlled and, since this is a DC motor, so is its speed. Again a control knob is preferably provided on the face panel of control unit 25 to carry out the adjustment of this speed control voltage in circuit 42.

Likewise included within control circuitry 34 is a control 43 for selecting either continuous or stop-start operation of motor 21. This is preferably governed by an off-on switch at the end of the rotary movement of the control knob for the spacing control circuit 35a. This switch essentially overrides the control signals from slicer control cicuitry 34, and may take the form of a switch capable of shorting the emitor and collector of transistor stage 36 to one another.

In the removal conveyor control circuitry 34, the output signal from the transistor stage 40 controls the starting of motor 21, while the output signal from the transistor stage 41 controls the stopping of motor 21. It will be noted that transistor stage 40 has in its output a load resistor 44 which can be shunted to varying degrees by adjustable contact 45. This adjustable contact is also preferably operated by a screwdriver adjustment. It will be recognized that its positioning will determine the rate of increase of the rising voltage applied to motor 21 in response to a motor start control signal from slicer control circuitry 30.

Transistor stage 41, on the other hand, has in its input circuit a potentiometer 46. The variable contact of this potentiometer 46 is preferably also adjustable by means of a screwdriver adjustment. It is apparent that this potentiometer 46 determines the rate at which the signal which causes the motor 21 to stop declines when a stop control signal is applied to circuitry 34 from slicer control circuitry 30.

Thus, variable resistance elements 45 and 46, respectively, determine the rate at which the speed of motor 21 increases when that motor starts and the rate at which the speed of that motor decreases when the motor stops.

Figure 4:
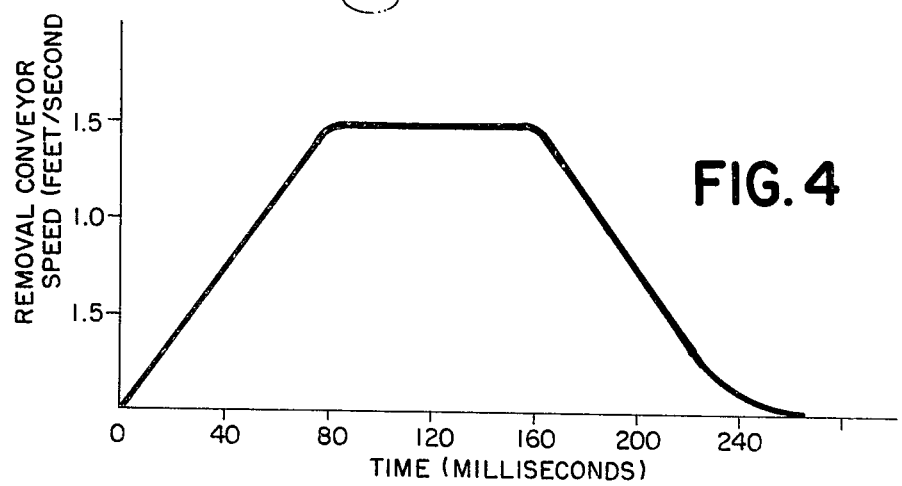
FIG. 4 is an explanatory diagram which will be referred to in discussing the operation of the invention.

FIG. 4 to which reference may now be had shows the general configuration of the variation of the speed of removal conveyor 15 as a function of time during a typical operating cycle of the equipment of FIG. 1 when adjusted for alternate slice and space operation. Since motor 21 provides direct drive to the conveyor 15, the same curve also represents motor speed as a function of time. Attention is particularly invited to the gradual rise in speed during the first 80 millisecond portion of the total 240 millisecond period of operation, and also to the gradual decline in this speed during the end portion from about 160 to about 240 milliseconds. It will be understood that 240 milliseconds represents only an illustrative value of the total duration of this operating angle. Shorter or longer intervals can be used as necessary. This duration is controlled by spacing control circuit 35a.

It is specifcally the introduction of this gradual rise and fall of the speed of removal conveyor motor 21 which surprisingly imparts the highly desirable characteristics to equipment embodying the present invention.

Specifically, it can be shown—and experience has likewise demonstrated—that the motor 21 (and conveyor 15) can be driven to a much higher peak speed using such gradual increase and gradual decrease than if the motor were simply actuated by an on-off switching action (as had conventionally been the practice) and yet the configuration of the sliced meat product accumulations on the removal conveyor, in either stack or fanning configuration, will not be adversely affected. Accumulations in stack configuration will retain their vertically aligned shape, and accumulations in fanning configuration will retain their evenly distributed configuration. This desirable phenomenon is so pronounced that the overall speed of the product removal operation by means of removal conveyor 15 can be materially increased over what has been considered as the conventional maximum. Thus, contrary to what might have been expected, it is not sudden acceleration and deceleration of motor 21 to and from its peak speed which yields the fastest effective product removal. Rather, in accordance with the invention, it is gradual acceleration and deceleration, but to a higher peak speed, which has this beneficial result.

Moreover, it has also been surprisingly found that in some cases it is possible to increase the overall speed of operation of the system even further, by driving motor 21 to an even higher drive voltage and therefore to a higher peak speed, but still with a gradually rising and gradually falling characteristic, to such an extent that there actually takes place some slippage between lower and higher positioned slices resting above each other on the conveyor belts 20. Because the gradual stopping and starting characteristics are adjustable in accordance with the present invention, rather than being indeterminate as they would be with the prior art on-off switching of motor 21, it is actually possible to empirically control these gradual starting and stopping transition phenomena so that slippage in one direction taking place during starting is substantially counteracted by slippage in the opposite direction during stopping. This makes it possible to raise still further the peak speed of the motor and with it the overall operating speed of the slicing equipment.

It is recognized that even the prior art on-off motor switching arrangements did not operate truly instantaneously, but had some inherent gradualness of transition due to motor inertia, for example. This would not be confused with the present invention for several reasons. First, there is a difference in degree so pronounced as to amount to a difference in kind. The inherent start and stop transitions in the prior art lasted perhaps 1 millisecond or less, rather than lasting say, 80 milliseconds or even more in accordance with the present invention. Secondly, in the prior art, the duration of transitions was not under the control of the slicing equipment operator. Finally, in the prior art there was no opportunity for independently controlling the transition from stop to run and that from run to stop as needed for best results.

All of these are important features of the present invention which impart to it its unique and unexpected characteristics.

It will also be understood that various modifications will occur to those skilled in the art without departing from the inventive concept dislcosed herein. For example, the slicing operation in accordance with the invention can also be carried out for sliced product accumulations in fanning configuration. In that event, the conveyor removal motor 21 would be running continuously at a comparatively low speed during product slicing and would be intermittently accelerated to a high speed for spacing. The intermittent acceleration, peak speed and subsequent deceleration would all be carried out in accordance with the present invention.

As a matter of fact, by coordinating the removal operation carried out in accordance with the invention appropriately with slicing rate, it is even possible to perform spacing without interrupting the slicing at all, during the time it takes one slice to fall onto the removal conveyor belts 20 after having been severed by wheel 11. Particularly in this mode of operation, it may be desirable to achieve predictable positioning of segments of the conveyor 15 for receiving falling slices from wheel 11 by use of shaft encoder means on motor 21, controlling the specific start and stop timing of the motor and the belts so driven by the motor.

I claim:

1. In a bulk product slicing equipment, which includes means for intermittently advancing the bulk product into a rotating slicing blade and conveyor means for intermittently removing accumulations of sliced product from the vicinity of the blade, the conveyor means including a conveyor drive motor which is controllably actuatable between a low and a high speed, the improvement which comprises:
   means for controlling the acceleration of the motor from the low to the high speed and the deceleration from the high to the low speed so that the accumulations are not deformed during this removal from the blade vicinity,
   said controlling means being adjustable separately from any other controls for the conveyor drive motor.

2. The equipment of claim 1 wherein
the controlling is of the rate of acceleration.

3. The equipment of claim 1 wherein
the controlling is of the rate of deceleration.

4. The equipment of claim 1 wherein
the controlling is of the rate of both acceleration and deceleration.

5. The equipment of claim 4 wherein
the low speed has a value of zero.

6. The equipment of claim 4 further comprising
means for also controlling the absolute value of the high speed so that the accumulations are not deformed during the removal.

7. The equipment of claim 6 further comprising
means for also controlling the absolute value of the low speed between zero and a predetermined finite value.

8. The equipment of claim 1 further comprising
means for establishing coordination between the advance of the bulk product into the blade and the times of occurrence of the acceleration and deceleration.

9. The equipment of claim 8 wherein
the coordinating means includes means for sensing the revolutions of the blade, and means responsive to predetermined numbers of sensed revolutions to initiate the accelerations and decelerations.

10. The equipment of claim 9 wherein
the coordinating means further includes means responsive to the predetermined numbers of sensed revolutions to control the advance of the product into the rotating blade.

11. The equipment of claim 1 wherein
the controlling means includes a plurality of transistor stages.

12. The equipment of claim 11 wherein
one of the transistor stages produces an accelerating signal and another stage produces a decelerating signal.

13. The equipment of claim 12 wherein means are provided for varying the impedance of the one and the other transistor stage.

14. The equipment of claim 1 wherein the conveyor drive motor is a high torque DC motor.

15. The equipment of claim 1 wherein the conveyor means includes a plurality of spaced belts trained about shafts rotatable by the conveyor drive motor.

16. The equipment of claim 1 which includes electrical circuitry for applying to the conveyor drive motor an electrical signal which varies between a first value corresponding to the low speed and a second value corresponding to the high speed, and wherein the means for controlling the acceleration and deceleration of said motor includes means for adjustably controlling the slope of the transitions of said signal between said first and second values.

* * * * *